Sept. 21, 1965 A. Z. BENDAR 3,207,454

TAPE REEL AND HUB

Filed Sept. 12, 1963 4 Sheets-Sheet 1

INVENTOR.
ARTHUR Z. BENDAR

INVENTOR.
ARTHUR Z. BENDAR
BY

INVENTOR.
ARTHUR Z. BENDAR

BY

INVENTOR.
ARTHUR Z. BENDAR

BY

United States Patent Office 3,207,454 Patented Sept. 21, 1965

3,207,454
TAPE REEL AND HUB

Arthur Z. Bendar, La Mirada, Calif., assignor to North American Aviation, Inc.

Filed Sept. 12, 1963, Ser. No. 308,520
5 Claims. (Cl. 242—68.3)

This invention relates to a tape reel and hub, and more particularly to apparatus that permits a reel to be quickly inserted into, and removed from, a machine.

Many present-day machines use strips of material that are wound onto a reel, or spool. Examples of these machines are: moving-picture cameras and projectors; magnetic-tape recorders; dictating machines; and machine tool programmers, which "read" the tape and control other devices in accordance with the information or "program" on the tape.

In each case the tape is wound on a reel. When the tape is to be used, the reel is mounted on the shaft of a suitable machine, the tape is threaded through a suitable tape-utilizing mechanism, and is then attached to a takeup reel. The machine rotates the takeup reel and the tape is pulled from the storage reel through tape-utilizing mechanism, and is then wound onto the takeup reel.

When the taped information has been used, the machine is reversed; and the tape is rewound onto the storage reel.

In many installations, the tape is used on several types of machines; and frequently the machines are made by different manufacturers. As a result, a reel that is adapted to fit on one machine frequently will not fit on another. In fact, a reel designed for an early machine of one manufacturer frequently will not fit onto a later-model machine of the same manufacturer.

It is therefore frequently necessary to remove the tape from one reel, and to rewind it onto another reel that fits the particular machine that is available, or is to be used. This extra winding and unwinding is of course undesirable.

In designing their machines, the various manufacturers use shafts of different diameters; and most manufacturers provide their own reels, and their own manner of holding the reel on the shaft. Some manufacturers use clamping flanges; other manufacturers use nuts or wing nuts; and still other manufacturers use spring clamps.

Most of these holding devices are awkward in their own way, and their multiplicity causes confusion when an operator has to mount or remove reels of tape from different machines.

It is therefore the principal object of the invention to provide an improved tape reel and reel holding hub.

The attainment of this object, and others, will be realized from the following specification, taken in conjunction with the drawings, of which—

Figure 1:
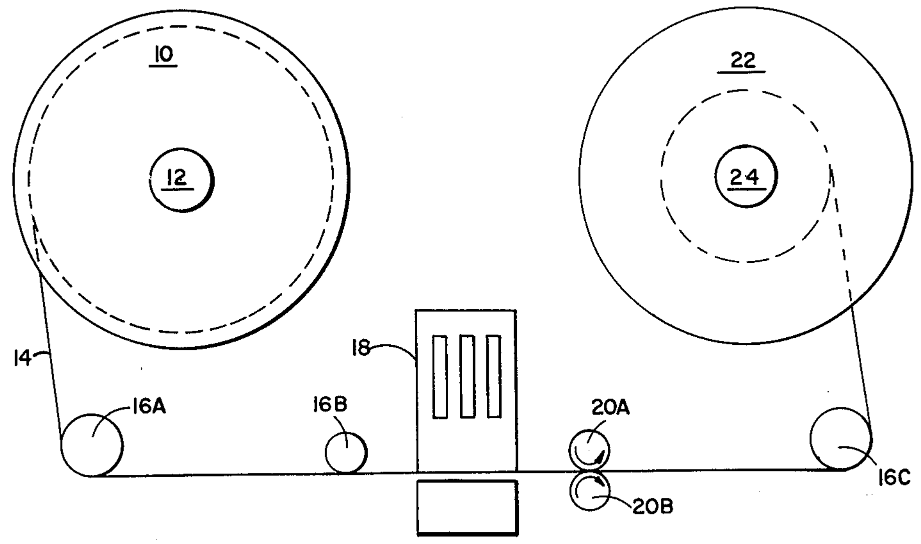
Figure 3:
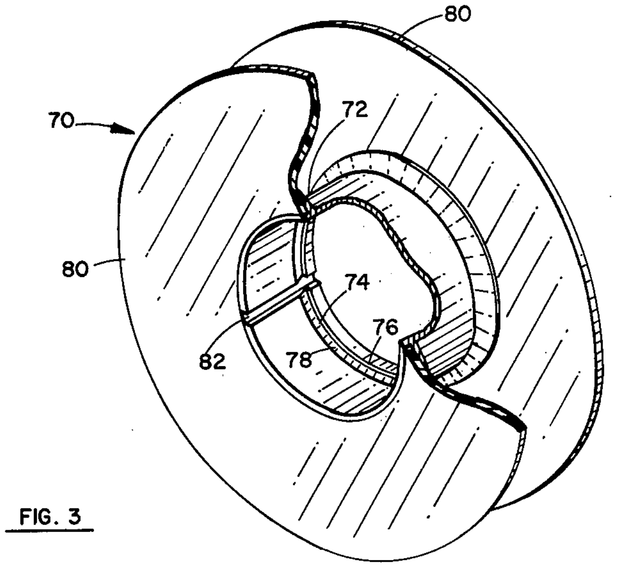
Figure 2:
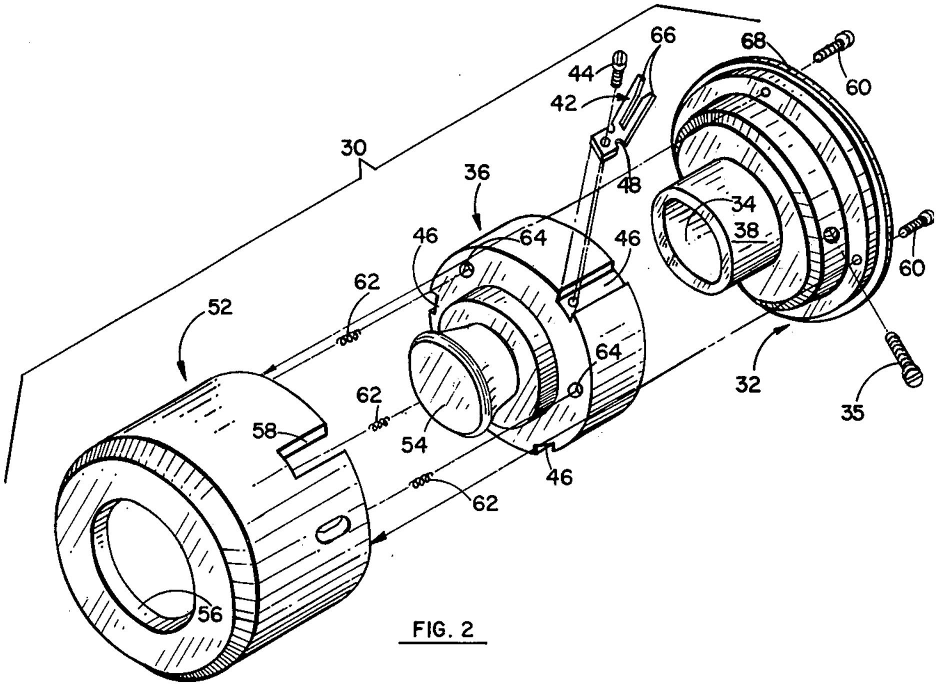
Figure 4:
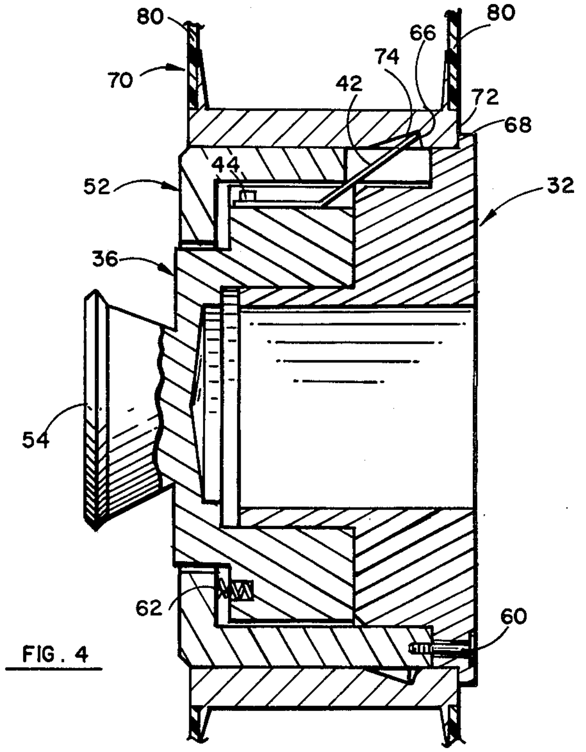
Figure 5:
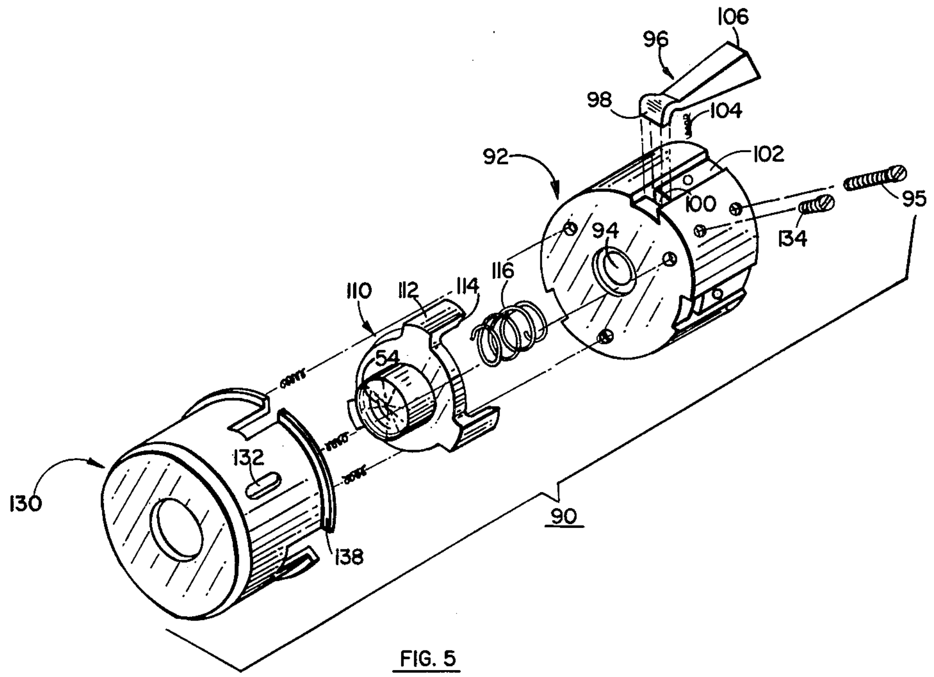
Figure 6:
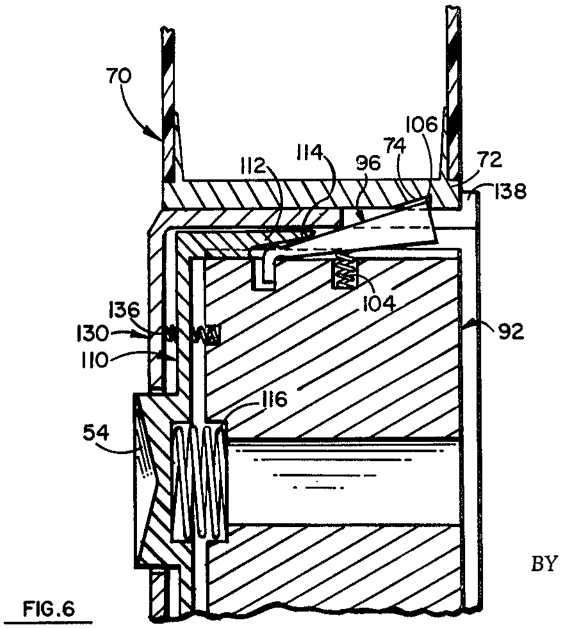
Figure 7:
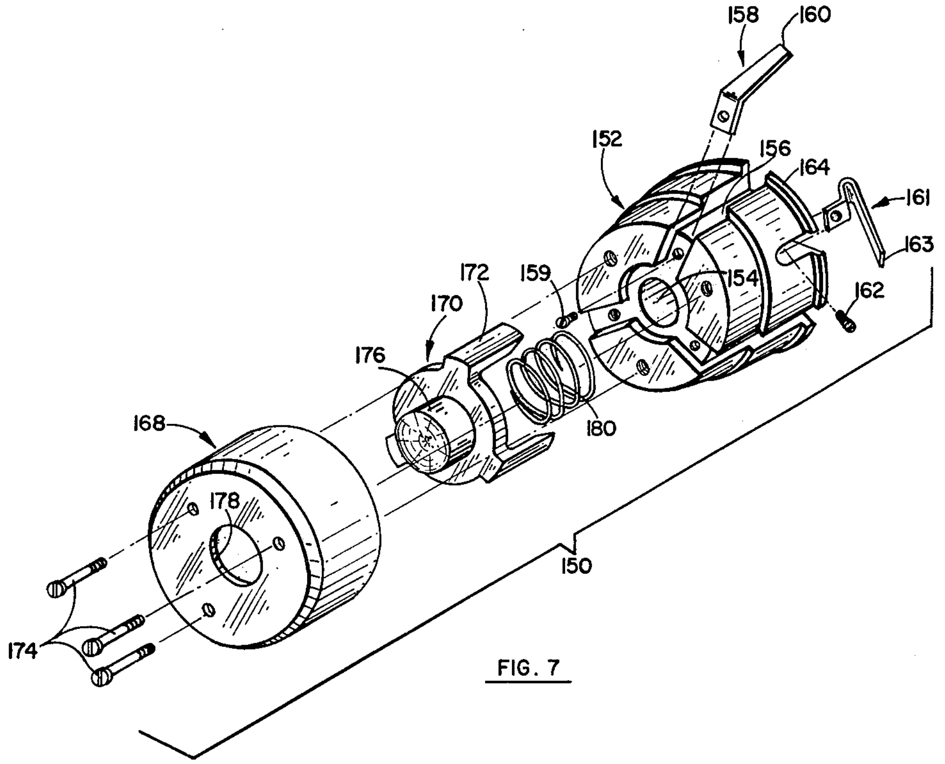
Figure 8:
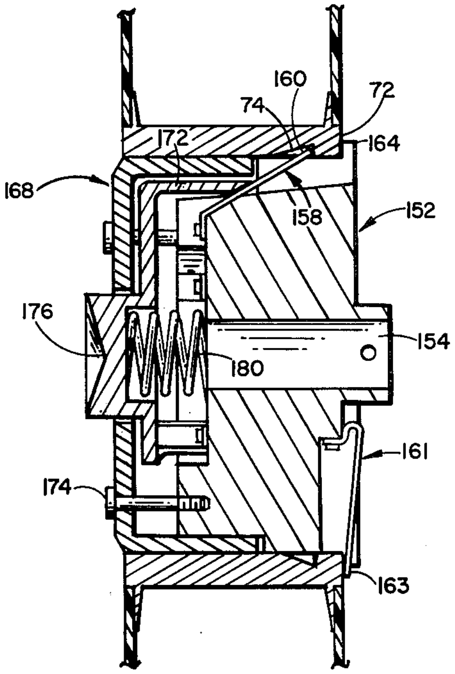

FIGURE 1 shows the basic use of a tape and reel;
FIGURES 2 and 4 show one form of the hub;
FIGURE 3 shows a reel;
FIGURES 5 and 6 show another form of the hub; and
FIGURES 7 and 8 show still another form of the hub.

Broadly speaking, the present invention contemplates a reel holding hub that can be permanently fastened to the shaft of any machine. This hub is so constructed, that a reel is merely pushed on; whereupon the reel is automatically locked onto the hub.

To remove the reel, a button-portion of the hub is pulled, or pressed; and the reel is automatically freed from the hub.

FIGURE 1 is a schematic representation of how the tape and reels are used. A storage reel 10 is mounted on a shaft 12, in order that it may rotate. The tape 14, which is wound on storage reel 10, is passed around suitable guide-rollers 16, and is threaded through a tape-utilizing mechanism 18. From here, the tape is passed between driving means such as a capstan 20A in conjunction with a pinch roller 20B around another guide roller 16, and thence to the takeup reel 22 which is mounted on its shaft 24. Generally, the tape must be rewound onto storage reel 10, which is then removed from the machine.

Depending upon conditions, storage reel 10 may be then placed onto another machine; or may be stored for an interval of time, after which it may be repositioned on the machine of FIGURE 1 or on another machine.

It will be understood that if reels 10 and 22 are designed to fit shafts 12 and 24 of a particular diameter or length, they may not fit the shafts of a different machine; and it is this fitting-problem which is to be solved.

In accordance with the present invention, a novel hub is mounted onto the shaft 12 and—if desired—onto the shaft 22 of every machine that will use the reels of tape; and a suitable reel snaps on, and off, the hub in a fraction of a second without a moment's delay, and without loose parts to go astray.

An exploded view of one form of hub is shown in FIGURE 2. Hub 30 comprises a body 32 that has a central bore 34 large enough to fit the largest shaft of the machines to be used. In order for body 32 to be used on machines having smaller diameter shafts, a suitable sleeve is positioned between the shaft and the inner surface of bore 34; and the body, the sleeve, and the shaft are fastened together—by means such as a locking screw 35—so that rotation of the shaft rotates the body 32 of the hub.

Hub 30 also comprises a releasing "spider" 36, which is longitudinally slidable along a boss 38 of the body 32. Spider 36 has a plurality of spring-like pawls 42 that project outwardly; the inner ends of pawls 42 being fastened, by means such as screws 44, to the spider body in slots 46. The outer ends of pawl-arms 42 are bent outwardly at a point indicated by reference character 48. For stability, three pawls are preferred; although only one is shown, for clarity.

Hub 30 also comprises an end-cap 52 that fits over the spider; a button 54 attached to the spider 36 projects through a central opening 56 of the end-cap 52; while the outer portion of the pawl 42 projects through a slot 58. The hub may be held together by means such as hub-screws 60 that are threaded into the cylindrical wall of end-cap 52.

Thus, the body 32 and the end-cap 54 are fastened together; and the spider 36 is longitudinally slidable in the hub by means of its protruding button 54.

Spider 36 is normally urged toward body portion 32, by means such as springs 62. One end of springs 62 fit into suitable recesses 64 of the spider 36, and their other ends press against the inside of end-cap 52.

Thus, when the hub is assembled, springs 62 urge the spider to the right, so that the tips 66 of the pawl 42 project through the slot 58 of the end-cap 52, to protrude above the outer surface of the hub.

It will be noted that body portion 32 has a shoulder 68, whose function will be described later.

In use, the body of the hub is fastened to the shaft. Pulling on button-portion 54 moves spider 36 to the left, against the springs 62. This leftward movement causes the upper surface of pawl 42 to bear against the lower end-surface of slot 58; and thus the tips 66 of the pawl 42 are pulled to the left and downward, into the pawl-receiving recesses of slots 58, so that they no longer protrude above the surface of the hub as may be more clearly understood from the cross-sectional view of FIGURE 4.

When the button 54 is released, springs 62 again urge the spider to the right; and the tips 66 of pawl-arms 42 move to the right and upward, so that they again protrude above the surface of the hub.

A reel suitable for use with the disclosed hub is shown in FIGURE 3. Reel 70 comprises a collar 72 whose inside diameter is dimensioned to fit the hub. Collar 72 has on its internal surface a circumferential "locking" groove 74, the back surface 76 of the groove being preferably, but not necessarily, perpendicular to the axis of the reel 70, and the other surface 78 of the groove preferably being angled.

Under some conditions, the reel must be rotated in a positively-driven manner in order to record information on the tape. For this reason the inner surface of collar 72 may contain a longitudinal "keyway" 82 that may be aligned with a keyway on the hub. Thus, a locking "key" may be inserted into the aligned keyways in order to lock together the spool and the hub. Under other conditions, a preferred positive interlock is a lug or set screw in the locking groove 74. However, neither type of interlock is required in many applications.

In use, the assembled hub 30 is mounted onto the shaft of the machine. A reel is slipped onto the hub, and pushed to the right. Three effects are produced, and they may be understood from FIGURE 4.

First of all, the rightward movement of the reel 70 bends the pawl 42 downwardly, so that their tips are pushed below the surface of the hub. Secondly, the continued rightward movement of the reel causes the back of the reel collar 72 to abut the shoulder 68 of the hub. And thirdly, by pulling button 54 forward or to the left the tips 66 of the pawl snap into groove 74 of the collar. The button 54 is now released.

Now the reel is securely locked to the hub by the engagement of the tip 66 of the pawl in the groove, the springs 62 pushing the collar 72 to the right, so that the back of the collar 72 abuts the locking shoulder 68 of the hub. Precise positioning is achieved by the use of shoulder 68; which thus determines the exact position of the reel on the shaft, and aligns the tape with the tape-utilizing mechanism.

Now as the shaft rotates, it carries the hub along with it; the hub in turn rotating the reel, and the tape wound thereon.

In order to remove the reel, it is only necessary to pull the button portion 54. This action moves the tips 66 of pawl 42 to the left and downward. When this is accomplished, the reel is free to move to the left, so that the locking action is terminated; the tips of the pawl now pressing only against the smooth inner-surface of the end cap 52 at slot 58. The reel can now be easily removed from the hub, and either stored or placed on another machine; while the hub is now free to receive a similar reel.

The body 32 may also contain a keyway, that may be keyed to a keyway of the shaft (either directly thereon or on a sleeve if employed to adapt the assembly for a shift of smaller diameter), in order to provide positively driven rotation.

An exploded view of another type of hub is shown in FIGURE 5. Hub 90 also comprises a body 92 having a central aperture 94 large enough to fit the largest shaft of the machines to be used. As previously described, sleeves are used to fit the body 92 to the shafts of the various machines; a suitable locking-screw 95 being used so that the body, the sleeve, and the shaft rotate together.

Mounted on the hub body 92 are a plurality, again preferably three for stability, of engaging pawls 96. In FIGURE 5, the pawls are preferably of a material such as nylon; the near end of the pawls containing a tongue 98 that fits into tongue-slots 100 of the hub body. When the tongue of the pawl is engaged in the slot of the body, the pawl cannot twist, turn, or slide; the only possible motion being an upward and downward movement of the distant end of the pawl. Thus the tongue-and-slot arrangement acts as a hinge that permits only this vertical angular movement.

It will be noted that the entire pawl 96 is receivable in a suitable pawl-slot 102; pawl-springs 104 urging the distant end of the pawl upwards so that, normally, the locking-tip 106 of the pawl protrudes above the surface of the hub body.

Hub 90 also comprises a releasing spider 110, the inner surfaces of spider-arms 112 preferably being tapered as shown by reference character 114. A spider-spring 116 urges the spider 110 to the left, relative to the body.

Hub 90 also comprises an end-cap 130 that fits over the spider; end-cap slots 132 and body-pins 134 permitting the end-cap to have a limited amount of longitudinal movement relative to the body 92, and still providing a captive end-cap. When the hub is assembled, the button 54 of the spider projects through the hole of the end-cap 130, the end-cap being normally held in this position by means of end-cap springs 136 positioned beyond periphery of spider 110.

It will be noted that end-cap 130 has a positioning-shoulder 138, whose function will be described later.

In use, when the spider 110 is pushed to the right against the spider-spring 116, the tapered-portions 114 of the spider-arms 112 engage the upper surface of pawls 96 and force the pawls downward into the pawl-slots 102 so that the locking-tips 106 of the pawls no longer protrude above the body of the hub. The end-cap 130 permits a limited amount of longitudinal spider movement relative to the body-portion and still provides a captive spider.

In use (see FIGURE 6), the body 92 of the hub is fastened to the shaft, and the reel 70 is then slipped onto the hub. The rightward movement of the reel causes the collar 72 thereof to abut positioning-shoulder 138, and continued rightward movement causes the end-cap 130 to move to the right against the end-cap-springs 136.

Continued rightward movement causes the collar 72 to depress pawls 96 into their receiving slots. As the reel continues to move to the right, the circumferential groove 74 in the inner surface of the collar reaches the position of the pawls and these now snap upwards so that their locking-tips 106 engage the circumferential groove. Now the reel is held by the shoulder 138 urging it to the left, while the pawl in the locking groove prevents the leftward movement of the spool.

To release the reel, the button 54 is pressed causing the spider 110 to move to the right against the spider spring 116.

The tapered ends 114 of the spider-arms 112 cause the pawls 96 to be moved downward, so that they are received in the pawl-recesses.

This downward pawl-movement withdraws the pawls' locking-tips 106 from the collar's circumferential groove, and the end-cap shoulder 130—under the influence of the extending end-cap-springs 136—shoulder 138 ejects the reel to the left. The locking-tips of the pawls now press against the smooth inner surface of the spider. Releasing pressure on button 54 permits spider 110 to move to left because of spring 116, allowing the pawl tips to move upward into their normal retaining position.

FIGURE 7 shows another type of hub that reduces the number and complexity of parts used. Here hub 150 comprises a body 152 having a central aperture 154 for receiving the shaft. Body 152 contains pawl-receiving recesses 156 that receive spring-pawls 158, which may be held to the body by means such as pawl-screws 159. Normally the tips 160 of the spring-pawls 158 protrude above the body 152.

Body 152 also comprises a plurality, preferably three for stability, of ejector-springs 161 that are held to the body by means such as ejector-spring-screws 162. Ejector springs 161 are formed and mounted in suitable recesses in such a manner that normally their tips 163 are to the left of shoulder 164. The function of the ejector-springs will be described later.

An end-cap 168 and a spider 170 having spider arms 172 are similar to those previously described, end-cap 168 being held to the body portion by means such as end-cap screws 174. In this way, the spider 170 has a limited longitudinal sliding movement within the hub; its button 176 protruding through the hole 178 of the end-cap under the urging of spring 180.

In use, as shown in FIGURE 8, the hub is mounted onto the shaft of the machine. A reel is slipped over the hub, and pushed backward. As previously described, three effects are produced.

First of all, the backward movement of the hub displaces ejector-springs 161 so that their tips 163 resist the rightward movement of the reel. Secondly, the collar 72 abuts positioning-shoulder 164, and thirdly, the spring-pawl's locking tip 160 snaps into the circumferential groove 74 of the reel's collar. When manual pressure is removed, reel ejector springs 161 push the surface of the locking-groove firmly against the pawl tips 160 as the final locked position of the reel in relation to the hub.

At this time the reel is securely locked to the hub by the opposed action of ejector springs 161 pushing to the left, and the engagement of the locking tip 160 of the spring pawl within the groove 74. Precise positioning is achieved by the engagement of the pawl tips in the locking-groove.

In order to remove the hub, it is only necessary to push in on the button 176. This action moves the spider arms 172 to the right until their tapered ends engage and depress the spring pawls far enough so that their locking tips 160 are withdrawn from the locking groove 74. When this is accomplished, the pressure of the ejector-springs 161 eject the reel to the left. The locking tips of the spring pawls having been removed from the groove, they are retained in the retracted position by the smooth inner-surface of the spider fingers. The reel can now be easily removed from the hub from its forward ejected position, and either stored or placed on another machine; while the spider moves leftward into its normally retracted position and with the spring's pawls extending above body. The hub is now free to receive a similar reel.

Although the invention has been illustrated and described in detail, it is to be clearly understood that the same is by way of illustration and example only and is not to be taken by way of limitation, the spirit and scope of this invention being limited only by the terms of the appended claims.

I claim:

1. A hub for latching a reel thereon comprising a cylindrical member adapted to be coaxially attached to a shaft at one end, said member having at least one longitudinal slot, a pawl and a spring forcing means carried in said slot, said pawl being hinged at one end thereof to engage a groove in the collar of a reel, and said pawl being forced away from said slot at its free end by said spring forcing means, the free end being disposed on said cylindrical member away from the end thereof adapted to receive said reel and near the shaft end, an end cap coaxially mounted on said cylindrical member on the end that is adapted to receive said reel, said end cap having a coaxial hole, a spider between said end cap and cylindrical member with a portion protruding through said coaxial hole in the end cap, and a spring biasing means, said spider being constrained by said end cap to axial movement in response to a manual force applied to said protruding portion, said spider and end cap assembly including means responsive to the axial movement of said spider against said spring biasing means for forcing said pawls against said spring forcing means whereby said pawl is forced into said slot to disengage a groove in said reel, said spider being urged by said spring biasing means to a position which allows said pawl to protrude from said slot to engage said groove of a reel, whereby a reel may be mounted on said hub and automatically engaged by said pawl by simply slipping the reel onto said hub, and disengaged for dismounting by manually applying a force to said protruding portion to axially move said spider against said spring biasing means thereby to force said pawl into said slot.

2. A hub for latching a reel thereon comprising a cylindrical member adapted to be coaxially attached to a shaft at one end, said member having at least one longitudinal slot, a pawl and a spring forcing means carried in said slot, said pawl being hinged at the end thereof adapted to receive a reel, the free end of said pawl being forced out of said slot by said spring forcing means to engage a groove in the collar of a reel as it is slipped onto said hub, an end cap coaxially mounted on the end of said cylindrical member that is adapted to receive a reel, said end cap having a coaxial hole, a spider constrained by said end cap to move axially in a space between said end cap and said cylindrical member, and a spring biasing means, said spider having a portion protruding through the hole in said end cap to which a manual force may be applied to move the spider axially against said spring biasing means, said spider and end cap assembly including means responsive to the axial movement of said spider against said spring biasing means for forcing said pawl into said slot to disengage the groove in a reel, said spider being urged by said spring biasing means to return to a position which allows said pawl to be forced out of said slot by said spring forcing means to engage the groove in a reel.

3. A hub for latching a reel thereon comprising a cylindrical member adapted to be coaxially attached to a shaft at one end, said member having at least one longitudinal slot, a pawl and spring forcing means carried in said slot, said pawl being hinged at the end thereof adapted to receive a reel, the free end of said pawl being forced out of said slot by said spring forcing means to engage a groove in the collar of a reel as it is slipped onto said hub, a spider and a coil spring coaxially mounted on said cylindrical member, said coil spring being placed between said spider and said cylindrical member whereby said spider is urged away from said cylindrical member by said coil spring, said spider having an arm adapted to ride in said slot over said pawl when moved axially against said coil spring, thereby to force the free end of said pawl down into said slot, and having a raised center portion on the side away from said cylindrical member to which a force may be applied to move it axially, an end cap coaxially mounted on said cylindrical member over said spider to limit the axial motion of said spider, said end cap having a coaxial hole through which the raised center portion of spider protrudes.

4. The combination of claim 3 including at least one ejector arm and a recess in the cylindrical member at the end thereof that is adapted to be attached to the shaft, said ejector arm comprising a spring biased arm formed and pivotally mounted in said recess of said cylindrical member in such a manner that it extends radially from said member and is urged by said spring bias in an axial direction toward the other end of said cylindrical member.

5. The combination of claim 4 including a reel releasably mounted on said hub, a shoulder at the end of said cylindrical member that is adapted to be attached to the shaft, said shoulder being axially spaced a predetermined distance from the free end of said pawl to positively limit the movement of said reel being slipped on said hub, said reel having a groove in the collar thereof, said pawl being forced into said groove by said spring forcing means, said groove being axially spaced from one side of said reel a distance less than said predetermined distance and from the other side of said reel a distance greater than said predetermined distance, whereby said reel may be slipped onto said hub and engaged by said pawl in only one of two possible directions.

References Cited by the Examiner

UNITED STATES PATENTS

| | | | |
|---|---|---|---|
| 2,251,470 | 8/41 | Stacey | 287—53 |
| 2,882,078 | 4/59 | MacDonald | 242—68.3 X |
| 2,889,123 | 6/59 | Hayden | 242—68.3 |
| 2,983,531 | 5/61 | Moro | 242—68.3 X |
| 2,992,788 | 7/61 | Hardison | 242—68.3 |
| 3,124,319 | 3/64 | Cohen et al. | 242—68.3 |

FOREIGN PATENTS

| | | |
|---|---|---|
| 896,860 | 3/45 | France. |

JORDAN FRANKLIN, *Primary Examiner.*